United States Patent Office 3,244,579
Patented Apr. 5, 1966

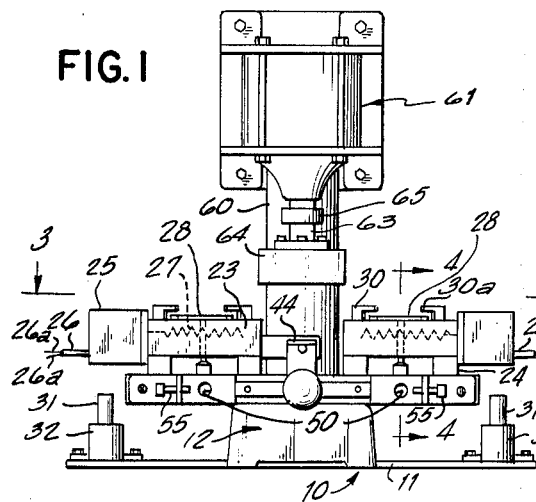

3,244,579
BONDED DECORATIVE ARTICLE
Anthony Chiesa, Flushing, N.Y., assignor to Park Electrochemical Corporation, Flushing, N.Y., a corporation of New York
Filed July 26, 1962, Ser. No. 212,651
3 Claims. (Cl. 161—138)

This invention relates to an improved machine for sealing metal foil to metal plates such as chrome plated die castings and the like, and to improvements in the product of such machine.

The invention has particular reference to the production of name plates and other indicia, wherein desired letters or designs are embossed or otherwise marked upon metal foil, such as aluminum foil, and wherein the aluminum foil is then bonded to a base plate. The invention has particular reference to the bonding of metal foil to a chrome plated die casting or the like. In accordance with the invention, the procedure is to apply a heat setting adhesive to the back of the foil, and then to bond the foil to the plate by means of adhesive. Because of the particular heat conducting characteristics of a chrome plated die casting or the like, it is important that the heat be applied evenly over the entire area of the foil and of the plate, and for sufficient period of time to insure proper bonding.

The preferred machine for the above purpose includes a horizontal seat die for reception of the plate and the aluminum foil in registration, with electrical heating means for heating the seat die. The machine further includes a vertically movable heating die which may be moved in opposition to the fixed seat die so as to engage against the foil and plate and insure that heat be applied directly to both elements. Such vertically movable heating die may further be heated by electrical heating means.

In order to reduce the cost, it is preferable to provide a machine having a single heat sealing station as above-described. It has been found preferable, under those conditions, to provide a carriage containing a plurality of seats which are horizontally movable in succession into and out of registration with the vertically movable heating member, by appropriate indexing movement of the carriage. The advantage of this arrangement is that it makes it possible for an operator to carry out manual operations of unloading and loading foil and plates from one seat while the foil and plate on another seat are being bonded.

An important object of this invention is to provide a machine of the above-described type, having simple manual means including a handle for moving the carriage in its indexing movement, and further means controled by said handle for initiating a cycle of lowering and raising the vertically movable heating die to seal the foil to the plate, with interlock means preventing said further means from becoming active before the carriage has completed its indexing movement.

In accordance with a preferred embodiment of the invention, the interlock means and the handle are provided with cooperating means such that the handle may be manipulated longitudinally, at the end of the indexing movement, to engage a control microswitch. This control microswitch is in the electric control circuit of electromechanical means for actuating the movable heating element in its downward movement.

Without limitation, the invention is particularly useful in the application of decorative and identifying indicia to metal. Instead of applying the indicia directly to the metal, such as a chrome-plated die casting, it is possible to emboss the indicia on heavy aluminum foil and then to seal the foil to the casting. The resulting article is more attractive and more economical to produce, and may be applied to an automobile, appliance or the like as a nameplate, decoration or the like.

Other objects and advantages of the invention will become apparent from the following description, in conjunction with the annexed drawing, in which a preferred embodiment of the invention is disclosed.

In the drawing,
FIG. 1 is a front elevational view of the improved machine.
FIG. 2 is a side elevational view of the improved machine.
FIG. 3 is a section on line 3—3 of FIG. 1.
FIG. 4 is a fragmentary section on line 4—4 of FIG. 1.
FIG. 5 is a vertical sectional view of the article produced by the machine.
FIG. 6 is a schematic electric and pneumatic circuit diagram of the machine.

Upon reference to the drawing in detail, it will be noted that it shows an elongated base 10 whose major axis extends laterally. Said base 10 may have any suitable construction and may include a plate 11 which rests upon a table or other support. A hollow, upstanding casting 12 is fixed to the center of plate 11. Laterally extending guideway plate 13 is fixed to the top of casting 12 and extends laterally outwardly thereof to points located laterally inwardly of the side edges of plate 11. Said plate 13 has upstanding front and rear lateral flanges 13a and 13b. Bars 14a and 14b are respectively fixed to the top of flanges 13a and 13b in parallel relation to plate 13 and extending respectively rearwardly of flange 13a and forwardly of flange 13b.

Carriage 20 includes a horizontal base plate 21 which is laterally elongated and which is slidably received on top of plate 13 and is guided by flanges 13a and 13b and members 14a and 14b are clearly shown in FIG. 4.

A pair of members 22 of substantially identical construction are mounted upon plate 21 of carriage 20 in laterally spaced relationship for receiving material to be bonded. Each said member 22 comprises a block 23 having feet 24 by means of which it is supported upon plate 21. The side of block 23 may be insulated in any suitable way (not shown). A box 25 is fixed to the outside of each block 23 and an appropriate cable 26 having wires 26a may be led into box 25, there to be connected to the terminals of heating coils 27 which are embedded in block 23 in any desired configuration. As a result, when the leads 26a are connected to any suitable external source of electric power, block 23 is heated.

Suitable means are provided on the upper face of block 23 for reception of material to be bonded. Specifically, a hardened seat die plate 28 of the size and shape of the plate to be treated is mounted upon the top of block 23. Block 28 is provided with an upstanding stop 29 at the rear of plate 28 which also extends slightly around the sides of plate 28. A pair of upstanding guide members 30 are fixedly mounted on the top of block 23 on either side of plate 28 and have tongues 30a which project over plate 28 in spaced relation thereto. Accordingly, the plate P and the overlying foil F which are to be treated can be placed upon plate 28 against stop 29 and under the tongues 30a. There is a slight clearance between the top of the foil F and the tongues 30a.

An air tube 31 is extended upwardly through an opening of plate 13 and extends below plate 13 to a fitting 32 on plate 11. A further tube 33 extends from fitting 32 rearwardly thereof, and air may be supplied to tube 33 and hence through fitting 32 and into tube 31. A further tube 34 extends into a through opening of carriage plate 31. This tube 34 is reduced in diameter at 34a above plate 21 and extends upwardly through a vertical bore of block 23 and through a registering opening of plate 28. When one seat is in position for sealing of foil F to plate P, the other seat is in position for withdrawal of the treated article, with tube 34 then registering vertically with tube 31. With the application of air so as to lower the movable heating plate for sealing of the material in sealing position, air is at the same time forced through tube 31 and tube 33 against the bottom of plate P to raise it so that it can be readily separated from its seat 28.

For movement of carriage 20, and for actuation of operating means to be explained below, block 40 is mounted upon plate 21 by means of screws 41. Block 40 is centrally located between the two seats 22 and extends vertically. Block 40 also extends longitudinally forwardly from approximately the midpoint of plate 21. Block 40 then extends over bar 14b forwardly thereof, and has a front depending portion 40a which extends slightly below the level of the main portion of the block. This shape of block 40 defines a cutout or recess 42 rearwardly of block portion 40a, said cutout extending into the bottom surface of the block and also extending between the sides thereof. Block portion 40a has a through longitudinal bore 43 which opens on the rear face of block portion 40a into recess 42. Block 40 has a further through longitudinal bore 44 just below the top thereof. Rod 45 extends slidably through bore 43 and extends forwardly and rearwardly of block portion 40a. Rod 46 extends slidably through bore 44 and extends forwardly and rearwardly of block 40. Handle 47 is fixedly mounted upon rod 45 forwardly of and spaced from block 40. Transverse plate 48 is fixedly connected to both rods 45 and 46 behind handle 47 and in front of block 40, so that the two rods move in unison.

A vertically and laterally extending stop fence 49 fixedly mounted upon the front face of flange 13b forwardly of guide flange 13a and rearwardly of block portion 40a and positioned so as to be clearingly received with bar 14b within recess 42 during lateral sliding movement of carriage 20. The fence 49 is spaced rearwardly of the front face of recess 42. Fence 49 has a pair of through apertures 50 respectively located near the respective side edges thereof. Normally, fence 49 bars complete rearward movement of rod 45. However, in respective extreme positions of carriage 20, rod 45 is aligned with a respective aperture 50, and handle 47 may then be pushed rearwardly to extend rod 45 through aperture 49.

Microswitch 52 is fixedly mounted upon bracket 53 which is in turn fixed to the rear face of block 40. Said microswitch 52 is located behind and in alignment with rod 46, with operating button 54 of microswitch 52 facing the rear end of rod 46. In the normal position of the rods, rod 46 is spaced from operating button 54. When rod 45 is aligned with aperture 50, and when handle 47 is then moved rearwardly to extend rod 45 into aperture 50, rod 46 then engages operating button 54 and closes the normally open microswitch 52.

Optionally and preferably, adjustable stops 55 are fixed by brackets 56 to the guide flange 13b at the extreme end thereof. When the carriage is moved in the direction of one or the other of the respective arrows 57, block 40 strikes the inner end of a respective laterally extending stop member 55 to prevent further travel of the carriage, and at this time rod 45 is aligned with a respective aperture 50.

Microswitch 52 is the actuating means for electrical-mechanical controls for a vertically movable heated die for cooperation with a respective lower heated die 28 for sealing of foil F to plate P. In this connection, base 12 is provided at its rear with a central, upwardly extending post 60. Double air cylinder 61 is fixedly mounted by means of attached collar 62 upon post 60. Shaft 63 extends downwardly and vertically slidably from cylinder 61. Block 64 is mounted upon the lower end of shaft 63. Bracket 65, affixed to shaft 63, carries a sleeve 65a which rides vertically on shaft 60 below collar 62.

Block 64 includes a die 68 on its lower face corresponding to die 28 and accordingly not shown in detail. This die 68 is heated by any suitable heating coil 27 extending into block 64 and connected to a source of electric power. The die 68 is in vertical alignment with one of the dies 28 when rod 45 is in alignment with one of the apertures 50. Upon supply of air into cylinder 61 and resulting lowering of block 64, plate P and foil F are engaged under pressure between the heated die 68 and 28, for the desired period of time, so as to bond the foil F to plate P.

FIG. 6 shows diagrammatically a conventional combined electric and air system for the apparatus, this system being mainly omitted in other views. Terminals 70 and 71 may be connected to any source of alternating electric power. Terminal 70 is connected through the normally open microswitch 52 to one input terminal of a timer or cycling device 73. Terminal 71 is connected to the other input terminal of cycling device 73. Device 73 serves to open the circuit to the output terminals thereof after a selected period of time even though switch 52 may remain closed. The output terminals of timer 73 are connected to the coil of solenoid valve 74. The electric circuit of the heat resistance coils is conventional and not shown.

In the position of solenoid valve 74 shown in FIG. 6, corresponding to energization of air entering main air line 82 under pressure, in the direction of arrow 83, from a source not shown, flows through the valve and line 67 into the upper end of cylinder 61, to force piston 63 downwardly and bring member 64 into sealing position. At the same time, air is exhausted from the lower end of piston 61, through line 84, the valve, line 85 and hence to lines 33. When valve 74 is deenergized, it reverses the line connections to connect line 82 to line 84 and line 67 to line 85. Accordingly, piston 63 is moved upwardly and air is again vented through lines 33. In either case, any plate P which is to be removed is unseated by air from line 33.

An important feature of the invention resides in the bonded article produced thereby. The anodized and embossed aluminum foil piece F is coated on its lower surface with a thermosetting adhesive A, such as a rubber and high carbon phenolic base adhesive which may be applied in liquid form by brush, roller or other suitable means. The adhesive should remain effective at temperatures of approximately 50° C. to 150° C. and should be highly resistant to moisture. Plate P may be, by way of example, a chrome-plated die casting. By way of example, the heat sealing operation may be carried out for four seconds, at pressure of 50 pounds and temperature of 190° C. In the resulting article, a separation pressure of greater than 10 pounds per square inch between foil F and plate P is required to separate them.

The conventional technique of application of the adhesive-coated foil F to plate P is unsatisfactory, because of inadequate control of the solvent and other factors. The heat-sealing technique disclosed herein permits commercial application of anodized and embossed metal foil to chrome-plated die castings, because proper adhesion is obtained.

While I have disclosed a preferred embodiment of the invention, and have indicated various changes, omissions and additions which may be made therein, it will be apparent that various other changes, omissions and additions may be made in the invention without departing from the scope and spirit thereof.

What is claimed is:

1. Bonded decorative article comprising a sheet of heavy aluminum foil pre-embossed and decorated on its top surface, a thermosetting adhesive coating on the lower surface of said aluminum foil, and a chrome-plated casting, said foil being adhered to said casting by said adhesive, said adhesive being heat set.

2. The bonded decorative article of claim 1 wherein said thermosetting adhesive coating remains effective at a temperature of approximately 50–150° C. and is highly resistant to moisture.

3. The bonded decorative article of claim 1 wherein said thermosetting adhesive coating is a rubber and high carbon phenolic base adhesive.

References Cited by the Examiner
UNITED STATES PATENTS

| | | | |
|---|---|---|---|
| 1,942,240 | 1/1934 | Chernow | 161—40 |
| 2,095,879 | 10/1937 | Kittridge et al. | 161—215 X |
| 2,166,289 | 7/1939 | Finke | 161—213 |
| 2,354,073 | 7/1944 | Swift | 161—213 |
| 2,381,186 | 8/1945 | Roquemore | 161—213 |
| 2,575,265 | 11/1951 | Fiedler. | |
| 2,610,910 | 9/1952 | Thompson. | |
| 2,650,185 | 8/1953 | Larson et al. | 161—215 X |
| 2,868,942 | 1/1959 | Lyijynen. | |
| 2,910,568 | 10/1959 | Schenkengel | 219—552 |

ANTHONY BARTIS, *Acting Primary Examiner.*

RICHARD M. WOOD, *Examiner.*

R. F. STAUBLY, *Assistant Examiner.*